(12) United States Patent
Allard et al.

(10) Patent No.: US 6,949,591 B1
(45) Date of Patent: Sep. 27, 2005

(54) COATING MATERIAL WHICH CAN BE THERMALLY CURED AND HARDENED BY ACTINIC RADIATION AND USE THEREOF

(75) Inventors: Maxime Allard, Dachstein (FR); Cyrille Jaecques, Schweighouse (FR); Isabelle Kauffer, Usmate (IT)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/018,106

(22) PCT Filed: Apr. 14, 2000

(86) PCT No.: PCT/EP00/03401

§ 371 (c)(1),
(2), (4) Date: Jan. 11, 2002

(87) PCT Pub. No.: WO00/68323

PCT Pub. Date: Apr. 14, 2001

(30) Foreign Application Priority Data

May 6, 1999 (DE) .......................................... 199 20 799

(51) Int. Cl.$^7$ ................................ C08F 2/50; C08J 3/28
(52) U.S. Cl. ............................ 522/96; 522/92; 522/81; 522/64; 522/137; 522/173; 522/179; 522/135; 522/144; 522/142; 522/90; 522/126; 522/130; 522/134; 522/174; 522/104; 522/107; 427/508; 427/487; 427/493
(58) Field of Search ............................. 522/90, 92, 93, 522/81, 64, 137, 173, 179, 135, 96, 107, 171, 142, 144, 126, 130, 134; 427/144, 142, 126, 130, 134, 174, 104, 107, 508, 493, 487

(56) References Cited

U.S. PATENT DOCUMENTS

| | | | |
|---|---|---|---|
| 4,013,806 A | 3/1977 | Volkert et al. ................. | 427/54 |
| 4,025,407 A | 5/1977 | Chang et al. .......... | 204/159.14 |
| 4,128,600 A | 12/1978 | Skinner et al. ............. | 260/859 |
| 4,139,385 A | 2/1979 | Crivello ...................... | 96/35.1 |
| 4,192,762 A | 3/1980 | Osborn et al. .............. | 252/182 |
| 4,212,901 A | 7/1980 | van Neerbos et al. ..... | 427/53.1 |
| 4,229,679 A | 10/1980 | Lode ....................... | 315/111.7 |
| 4,247,578 A | 1/1981 | Skinner et al. ............... | 427/44 |
| 4,268,542 A | 5/1981 | Sakakibara et al. ......... | 427/195 |
| 4,287,116 A | 9/1981 | Burns .......................... | 260/37 |
| 4,342,793 A | 8/1982 | Skinner et al. ............... | 427/44 |
| 4,377,457 A | 3/1983 | Boeckeler et al. ..... | 204/159.16 |
| 4,415,604 A | 11/1983 | Nativi ....................... | 427/54.1 |
| 4,424,252 A | 1/1984 | Nativi ......................... | 428/209 |
| 4,444,954 A | 4/1984 | Mels et al. .................. | 525/124 |

(Continued)

FOREIGN PATENT DOCUMENTS

| | | | |
|---|---|---|---|
| CA | 2 153 581 | 1/1920 | .......... C08G/18/67 |
| CA | 2 073 115 | 7/1992 | .......... C08L/75/14 |

(Continued)

OTHER PUBLICATIONS

English Abstract for DE3828098 from EPO, Mar. 4, 1990.
English Abstract for DE4011045 from EPO, Oct. 9, 1991.
English Abstract for DE4020316 from EPO, Jan. 9, 1992.
English Abstract for DE4025215 from EPO, Feb. 19, 1992.
English Abstract for JP06–286008 from EPO, Oct. 11, 1994.
Allard, et al., U.S. Appl. No. 10/009394 filed Oct. 25, 2001.
English Abstract for EP0872502 from EPO, Oct. 21, 1998.
Fritz Bartol et al., U.S. Appl. No. 09/263,426 filed Mar. 5, 1999.
English Translation for DE 198 26 715.
U.S. Appl. No. 10/470,863, filed Jul. 31, 2003.
U.S. Appl. No. 10/018,351, filed Dec. 7, 2001.
U.S. Appl. No. 10/018,352, filed Dec. 7, 2001.
U.S. Appl. No. 10/018,703, filed Dec. 13, 2001.
U.S. Appl. No. 09/926,532, filed Nov. 16, 2001.
Aaron Lockhart, Bayer Polymers, Pittsburgh, PA, dated Jun. 9–11, 2003.
English Language Abstract for WO94/22969 provided with International Publication.
English Language Abstract for EP 0 596 460 A2.
English Language Abstract for WO99/50359 provided with International Publication.
English Language Abstract for EP 0 540 884 A1.
English Language Abstract for WO 90/01041 provided International Publication.
U.S. Appl. No. 08/564,304, filed Jan. 22, 1996.
"Methoden der organischen chemie", Houben–Weyl, Volum 14/2, 4th Edition, Georg Tjieme Verlag, Stuttgart, 1963, pp. 61 to 70, by W. Siefken, Liebigs Annalen der Chemie, vol. 562, pp. 75 to 136.
Singh and coworkers, "Carbamylmethylated Melamines, Novel Crosslinkers for the Coatings Industry" in Advanced Organic Coating Science and Technology Series, 1991, vol. 13, pp. 193 to 207 @ p. 47, LL. 11–14.

Primary Examiner—James J. Seidleck
Assistant Examiner—Sanza L. McClendon

(57) ABSTRACT

A coating material curable thermally and with actinic radiation, comprising at least one constituent (a1) containing at least two functional groups (a11) which serve for crosslinking with actinic radiation, and if desired at least one functional group (a12) which is able to undergo thermal crosslinking reactions with a complementary functional group (a22) in the constituent (a2), and at least one constituent (a2) containing at least two functional groups (a21) which serve for crosslinking with actinic radiation, and at least one functional group (a22) which is able to undergo thermal crosslinking reactions with a complementary functional group (a12) in the constituent (a1), and also, if desired, comprising at least one photoinitiator (a3), at least one thermal crosslinking initiator (a4), at least one reactive diluent curable thermally and/or with actinic radiation (a5), at least one coatings additive (a6), and/or at least one thermally curable constituent (a7), with the proviso that the coating material contains at least one thermally curable constituent (a7) if the constituent (a1) has no functional group (a12). The coating material is used to seal SMCs (sheet molded compounds) and BMCs (bulk molded compounds).

14 Claims, No Drawings

U.S. PATENT DOCUMENTS

| | | | |
|---|---|---|---|
| 4,481,093 A | 11/1984 | Murphy et al. | 204/159.19 |
| 4,489,135 A | 12/1984 | Drexler et al. | 428/423.1 |
| 4,514,460 A | 4/1985 | Johnson | 428/245 |
| 4,526,939 A | 7/1985 | Lewarchik et al. | 525/438 |
| 4,532,021 A | 7/1985 | Murphy et al. | 204/159 |
| 4,558,090 A | 12/1985 | Drexler et al. | 524/591 |
| 4,607,084 A | 8/1986 | Morris | 525/454 |
| 4,618,632 A | 10/1986 | Su | 522/43 |
| 4,634,602 A | 1/1987 | Sirkoch et al. | 427/44 |
| 4,675,234 A | 6/1987 | Sachs et al. | 428/328 |
| 4,710,542 A | 12/1987 | Forgione et al. | 525/127 |
| 4,746,366 A | 5/1988 | Philipp et al. | 106/287.19 |
| 4,761,435 A | 8/1988 | Murphy et al. | 522/46 |
| 4,786,657 A | 11/1988 | Hammer et al. | 522/90 |
| 4,851,460 A | 7/1989 | Stranghöner et al. | 523/407 |
| 4,880,867 A | 11/1989 | Gobel et al. | 524/507 |
| 4,939,213 A | 7/1990 | Jacobs, III et al. | 525/329.9 |
| 4,945,128 A | 7/1990 | Hille et al. | 524/591 |
| 4,952,612 A | 8/1990 | Brown-Wensley et al. | 522/25 |
| 4,985,340 A | 1/1991 | Palazzotto et al. | 430/270 |
| 5,013,631 A | 5/1991 | Su | 430/271 |
| 5,075,372 A | 12/1991 | Hille et al. | 524/839 |
| 5,084,541 A | 1/1992 | Jacobs, III et al. | 528/45 |
| 5,089,376 A | 2/1992 | Setthachayanon | 430/284 |
| 5,153,101 A | 10/1992 | Meire et al. | 430/281 |
| 5,234,970 A | 8/1993 | Kyle | 522/96 |
| 5,236,995 A | 8/1993 | Salatin et al. | 524/591 |
| 5,326,621 A | 7/1994 | Palazzotto et al. | 428/195 |
| 5,334,420 A | 8/1994 | Hartung et al. | 427/407.1 |
| 5,342,882 A | 8/1994 | Göbel et al. | 524/832 |
| 5,356,669 A | 10/1994 | Rehfuss et al. | 427/407.1 |
| 5,368,944 A | 11/1994 | Hartung et al. | 428/423.1 |
| 5,370,910 A | 12/1994 | Hill et al. | 427/407.1 |
| 5,409,740 A | 4/1995 | Brann | 427/513 |
| 5,416,136 A | 5/1995 | Konzmann et al. | 523/414 |
| 5,418,264 A | 5/1995 | Obloh et al. | 523/414 |
| 5,425,970 A | 6/1995 | Lahrmann et al. | 427/493 |
| 5,453,451 A | 9/1995 | Sokol | 522/42 |
| 5,462,797 A | 10/1995 | Williams et al. | 428/345 |
| 5,474,811 A | 12/1995 | Rehfuss et al. | 427/407.1 |
| 5,512,322 A | 4/1996 | Hille et al. | 427/407.1 |
| 5,552,496 A | 9/1996 | Vogt-Birnbrich et al. | 525/440 |
| 5,569,705 A | 10/1996 | Vogt-Birnbrich et al. | 524/591 |
| 5,571,861 A | 11/1996 | Klein et al. | 524/591 |
| 5,580,614 A | 12/1996 | Amberg-Schwab et al. | 427/493 |
| 5,601,878 A | 2/1997 | Kranig et al. | 427/386 |
| 5,601,880 A | 2/1997 | Schewarte et al. | 427/407.1 |
| 5,605,965 A | 2/1997 | Rehfuss et al. | 525/100 |
| 5,610,224 A | 3/1997 | DePue et al. | 524/538 |
| 5,623,016 A | 4/1997 | Klein et al. | 524/591 |
| 5,626,958 A | 5/1997 | D'Herbecourt et al. | 428/327 |
| 5,654,391 A | 8/1997 | Göbel et al. | 525/123 |
| 5,658,617 A | 8/1997 | Göbel et al. | 427/372.2 |
| 5,686,531 A | 11/1997 | Engelke et al. | 525/111 |
| 5,691,419 A | 11/1997 | Engelke et al. | 525/208 |
| 5,691,425 A | 11/1997 | Klein et al. | 525/455 |
| 5,716,678 A | 2/1998 | Röckrath et al. | 427/407.1 |
| 5,922,473 A | 7/1999 | Muthiah et al. | 428/481 |
| 5,965,213 A | 10/1999 | Sacharski et al. | 427/475 |
| 6,001,424 A | 12/1999 | Lettmann et al. | 427/407.1 |
| 6,001,915 A | 12/1999 | Schwarte et al. | 524/457 |
| 6,017,640 A | 1/2000 | Muthiah et al. | 428/514 |
| 6,159,556 A | 12/2000 | Möller et al. | 427/475 |
| 6,177,535 B1 | 1/2001 | Schwalm et al. | 528/49 |
| 6,242,101 B1 | 6/2001 | Schealm et al. | 428/425.8 |
| 6,265,476 B1 | 7/2001 | Krongauz et al. | 524/262 |
| 6,332,291 B1 * | 12/2001 | Flosbach et al. | 522/91 |
| 6,333,077 B1 | 12/2001 | Maag et al. | 427/496 |
| 6,335,397 B1 | 1/2002 | Kokel et al. | 524/507 |
| 6,344,501 B1 | 2/2002 | Sierakowski et al. | 523/410 |
| 6,476,121 B1 | 11/2002 | Kadambande et al. | 524/560 |
| 6,482,869 B1 | 11/2002 | Bolte et al. | 522/35 |
| 6,534,187 B2 | 3/2003 | Kron et al. | 428/447 |
| 2003/0023017 A1 | 1/2003 | Rink et al. | 526/301 |
| 2003/0077394 A1 | 4/2003 | Bradford et al. | 427/407.1 |
| 2003/0078315 A1 | 4/2003 | Bradford et al. | 522/126 |
| 2003/0078316 A1 | 4/2003 | Bradford et al. | 522/126 |
| 2003/0083397 A1 | 5/2003 | Bradford et al. | 522/173 |

FOREIGN PATENT DOCUMENTS

| | | | |
|---|---|---|---|
| CA | 2073115 | 7/1992 | C08L/75/14 |
| CA | 2 079 498 | 9/1992 | B05D/3/06 |
| CA | 2102169 | 5/1994 | C09D/175/14 |
| CA | 2102170 | 5/1994 | C09D/175/14 |
| DE | 34 07 087 A1 | 5/1985 | C09D/3/82 |
| DE | 38 28 098 | 3/1990 | C08G/77/58 |
| DE | 38 28 098 A1 | 3/1990 | C08G/77/58 |
| DE | 40 11 045 | 10/1991 | B05D/7/02 |
| DE | 40 11 045 A1 | 10/1991 | B05D/7/02 |
| DE | 40 20 316 | 1/1992 | C09D/183/04 |
| DE | 40 20 316 A1 | 1/1992 | C09D/183/04 |
| DE | 40 25 215 | 2/1992 | C08G/59/50 |
| DE | 41 22 743 C1 | 11/1992 | C09D/4/00 |
| DE | 42 22 194 | 1/1994 | C09D/5/46 |
| DE | 43 02 327 | 8/1994 | C08G/18/67 |
| DE | 43 03 570 A1 | 8/1994 | B05D/7/26 |
| DE | 43 28 092 A1 | 2/1995 | C09D/175/04 |
| DE | 196 13 547 | 7/1996 | C09D/5/46 |
| DE | 197 09 560 C1 | 7/1998 | C09D/201/02 |
| DE | 198 26 715 | 1/1999 | C07C/69/54 |
| DE | 199 20 799 | * 11/2000 | C09D/175/00 |
| DE | 199 20 801 | 11/2000 | B05D/7/24 |
| DE | 199 30 067 | 1/2001 | C09D/133/04 |
| DE | 199 30 664 | 1/2001 | C09D/125/02 |
| DE | 199 30 665 | 1/2001 | C09D/125/02 |
| DE | 199 24 674 | 6/2001 | C09D/5/00 |
| EP | 0 089 497 A2 | 2/1983 | C09D/3/72 |
| EP | 0 228 003 A1 | 12/1986 | B05D/7/16 |
| EP | 0 234 361 A1 | 2/1987 | C08G/18/08 |
| EP | 0 234 362 A1 | 2/1987 | C08G/18/08 |
| EP | 0 245 700 A2 | 4/1987 | C07D/251/54 |
| EP | 0 256 540 A2 | 8/1987 | C09D/3/49 |
| EP | 0 260 447 A2 | 8/1987 | C08F/283/10 |
| EP | 0 299 148 A2 | 4/1988 | C08G/18/08 |
| EP | 0 297 576 A1 | 6/1988 | C09D/3/72 |
| EP | 0 354 261 A1 | 8/1988 | C08G/18/50 |
| EP | WO90/01041 | 2/1990 | C08G/18/08 |
| EP | 0 394 737 A1 | 4/1990 | C09D/175/06 |
| EP | 0 401 565 A1 | 5/1990 | C09D/5/02 |
| EP | 0 401 892 | 5/1990 | C09D/167/06 |
| EP | 0 424 705 A2 | 10/1990 | C08F/283/00 |
| EP | 0 521 928 B1 | 3/1991 | C08F/299/06 |
| EP | 0 593 454 B1 | 3/1991 | B05D/7/26 |
| EP | 0 574 417 B1 | 2/1992 | B05D/5/06 |
| EP | 0 522 419 A1 | 6/1992 | C08G/18/67 |
| EP | 0 522 420 A2 | 6/1992 | C08J/3/03 |
| EP | 0 523 610 A1 | 7/1992 | C09D/163/00 |
| EP | 0 536 712 A2 | 10/1992 | C09D/201/02 |
| EP | 0 540 884 A1 | 10/1992 | B05D/3/06 |
| EP | WO92/22615 | 12/1992 | C09D/151/08 |
| EP | 0 568 967 A2 | 5/1993 | B05D/3/00 |
| EP | 0 581 211 A1 | 7/1993 | C08G/18/08 |
| EP | 0 584 818 B1 | 8/1993 | C08G/18/08 |
| EP | 0 590 484 A1 | 9/1993 | C08G/18/08 |
| EP | WO93/17060 | 9/1993 | C08G/63/02 |
| EP | 0 594 068 | 10/1993 | C09D/201/02 |
| EP | 0 594 071 A1 | 10/1993 | C09D/201/02 |
| EP | 0 594 071 | 10/1993 | C09D/201/02 |
| EP | 0 594 142 | 10/1993 | C08L/57/12 |

| | | | | | | | | |
|---|---|---|---|---|---|---|---|---|
| EP | 0 594 142 A1 | 10/1993 | ............ C08L/57/12 | EP | WO97/49747 | 12/1997 | ............ C08G/18/75 |
| EP | 0 596 460 A2 | 11/1993 | ......... C09D/201/00 | EP | 0 872 502 | 3/1998 | ............ C08G/18/68 |
| EP | 0 596 461 A2 | 11/1993 | ......... C09D/201/00 | EP | 0 940 459 | 2/1999 | ......... C09D/201/00 |
| EP | 0 604 992 A1 | 12/1993 | ......... C08K/5/3492 | EP | WO99/55785 | 4/1999 | ............. C09D/4/00 |
| EP | 0 624 577 A1 | 5/1994 | ......... C07D/251/70 | EP | WO99/50359 | 10/1999 | ............. C09D/5/00 |
| EP | 0 708 788 B1 | 6/1994 | ............ C08G/18/08 | GB | 1 583 412 | 8/1977 | ......... C08F/226/02 |
| EP | 0 634 431 A1 | 7/1994 | ............ C08G/18/12 | WO | WO 94/10211 | 5/1994 | ............. C08F/8/30 |
| EP | WO 94/22969 | 10/1994 | ......... C09D/133/06 | WO | WO94/10211 | 5/1994 | ............. C08F/8/30 |
| EP | 0 649 865 41 | 10/1994 | ............ C08G/18/67 | WO | WO 94/10212 | 5/1994 | ............. C08F/8/30 |
| EP | 0 669 356 A1 | 2/1995 | ............ C08G/18/83 | WO | WO94/10213 | 5/1994 | ............. C08F/8/30 |
| EP | 0 678 536 A1 | 4/1995 | ............ C08G/18/08 | WO | WO 94/10213 | 5/1994 | ............. C08F/8/30 |
| EP | WO95/14721 | 6/1995 | ......... C08F/290/14 | WO | WO 9820047 | 5/1998 | ............. C08F/2/06 |
| EP | 0 753 358 A1 | 4/1996 | ............ B05D/1/00 | WO | WO9955785 | * 11/1999 | |
| EP | WO96/12747 | 5/1996 | ......... C08F/285/00 | WO | WO 02/10292 | 2/2002 | ............. C09D/4/06 |
| EP | WO96/12754 | 5/1996 | ............ C08G/63/70 | WO | WO 02/34808 | 5/2002 | ............ C08G/18/67 |
| EP | 0 753 358 | 7/1996 | ............ B05D/1/00 | WO | WO 02/074872 | 9/2002 | ......... C09D/175/04 |
| EP | 0 844 286 | 12/1997 | ............ C09D/5/03 | | | | |
| EP | 0 844 286 A1 | 12/1997 | ............ C09D/5/03 | * cited by examiner | | | |
| EP | WO97/49745 | 12/1997 | ............ C08G/18/08 | | | | |

COATING MATERIAL WHICH CAN BE THERMALLY CURED AND HARDENED BY ACTINIC RADIATION AND USE THEREOF

This application is a National Phase Application of Patent Application PCT/EP00/03401 filed on 14 Apr. 2000.

The present invention relates to a novel coating material curable thermally and with actinic radiation. The present invention additionally relates to the use of the novel coating material for sealing the porous surface of SMCs (sheet molded compounds) and BMCs (bulk molded compounds).

SMCs and BMCs have been used for a long time to produce sanitary articles, domestic appliances and structural components of complex shape, especially for automotive construction, such as protective panels, fenders, doors, or lamp reflectors. Because of their structure and their material composition on the basis of glass fibers, the SMCs and BMCs are of high temperature resistance and withstand temperatures of 190 to 200° C. with little deformation. Furthermore, the complex articles may be produced more easily and with greater accuracy using this technology than using reinforced thermoplastics.

A disadvantage of the SMCs and BMCs is that they have a microporous surface and therefore cannot be coated directly, since microbubbles (blisters) are formed in the coating at 70 to 80° C. by monomers such as styrene escaping in gaseous forms.

The measures which must be taken to counter this problem are complicated.

For example, the European patent EP-A-0 753 358 discloses a process for coating SMCs and BMCs in which the material is coated first with a layer of an adhesion promoter and second with a gas-impervious barrier coat. The barrier coat consists of a transparent two-component polyurethane coating which has been fully cured at 60° Celsius. However, the barrier coat is unable to meet all the requirements imposed on a sealing coat.

In another process, sealing is effected by applying a powder coating material. However, SMCs and BMCs have a low thermal conductivity, so that the powder does not flow out correctly. Moreover, the temperatures of up to 180° C. that are needed to crosslink the powder coating material greatly increase the gaseous escape of the monomers from the materials. In order to suppress this, in turn, it is necessary to employ coat thicknesses of up to 70 $\mu$m. This is firstly uneconomic, owing to the higher level of material consumption, and on the other hand necessitates the sanding of the crosslinked powder coats in order to remove surface structures such as orange peel.

The SMCs and BMCs may also be sealed using coating materials which are curable with actinic radiation, especially UV radiation (cf. the patents U.S. Pat. No. 4,139,385 or EP-A-0 262 464). The resulting sealing coat is often found, however, to be too hard and difficult to overcoat.

It is therefore an object of the present invention to find a new sealing system for SMCs and BMCs which no longer has the disadvantages of the prior art but which instead easily and effectively suppresses the formation of microbubbles (blisters), has a smooth surface free from structures such as orange peel, said surface requiring no aftertreatment, is easy and safe to overcoat, and does not give rise to any subsequent problems of intercoat adhesion.

Accordingly we have found the novel coating material curable thermally and with actinic radiation and comprising
(a1) at least one constituent containing
  (a11) at least two functional groups which serve for crosslinking with actinic radiation, and if desired
  (a12) at least one functional group which is able to undergo thermal crosslinking reactions with a complementary functional group (a22) in the constituent (a2), and
(a2) at least one constituent containing
  (a21) at least two functional groups which serve for crosslinking with actinic radiation, and
  (a22) at least one functional group which is able to undergo thermal crosslinking reactions with a complementary functional group (a12) in the constituent (a1), and also, if desired, comprising
(a3) at least one photoinitiator,
(a4) at least one thermal crosslinking initiator,
(a5) at least one reactive diluent curable thermally and/or with actinic radiation,
(a6) at least one coatings additive, and/or
(a7) at least one thermally curable constituent,
with the proviso that the coating material contains at least one thermally curable constituent (a7) if the constituent (a1) has no functional group (a12).

In the text below, the novel coating material curable thermally and with actinic radiation is referred to as the "coating material of the invention".

We have also found the new process for sealing SMCs (sheet molded compounds) and BMCs (bulk molded compounds) by applying a primer coat of a coating material and curing the primer coat, wherein said coating material comprises the coating material of the invention.

In the text below, the novel process for sealing SMCs and BMCs is referred to the "sealing process of the invention".

Additionally, we have found the novel SMCs (sheet molded compounds) and BMCs (bulk molded compounds), sealed with a primer coat, which are producible with the aid of the sealing process of the invention.

In the text below, the novel SMCs and BMCs sealed with a primer coat are referred to as the "compounds of the invention".

Moreover, we have found the novel clearcoats and multicoat color and/or effect coating systems which may be produced with the aid of the coating material of the invention.

In the text below, the novel clearcoats and multicoat color and/or effect coating systems are referred to as the "clearcoat of the invention" and "multicoat systems of the invention", and the corresponding processes for producing them are referred to as the "coating processes of the invention".

In the context of the present invention, the term "thermal curing" denotes the heat-initiated curing of a film of a coating material in which, normally, a separate crosslinking agent is employed. This is commonly referred to by those in the art as external crosslinking. Where the crosslinking agents are already incorporated in the binders, the term used is self-crosslinking. In accordance with the invention, external crosslinking is of advantage and is therefore employed with preference.

In the context of the present invention, actinic radiation means electron beams or, preferably, UV radiation. Curing by UV radiation is normally initiated by free-radical or cationic photoinitiators and in terms of its mechanism is a free-radical or cationic photopolymerization.

Where thermal curing and curing with actinic light are employed together for a coating material, the term "dual cure" is also used.

In the light of the prior art it was surprising and unforeseeable for the skilled worker that the very complex problem on which the present invention is based might be solved with the aid of the coating material of the invention, of the sealing process of the invention and of the compounds of the invention, and that further fields of application might be opened up to the coating material of the invention with the clearcoats and multicoat systems of the invention.

It is particularly surprising that the use of the coating material of the invention results in a sealing system which easily and effectively suppresses the formation of microbubbles (blisters), has a smooth surface free from structures such as orange peel, requiring no aftertreatment, and can be overcoated easily and safely without giving rise to subsequent problems of intercoat adhesion.

A further surprise is that the outstanding overcoat-ability is retained even when the sealing coat or primer coat on electrically conductive compounds of the invention is overcoated with an electrodeposition coating material. This makes it possible to build the compounds of the invention directly into the uncoated automobile bodies and to coat them in the same way as the metal parts, which is a very special advantage of the present invention.

Even more of a surprise is that the coating material of the invention is generally outstandingly suitable, as well, for coating primed or unprimed substrates other than SMCs and BMCs.

Suitable substrates in this context are all surfaces for coating that are amenable to a combined cure using heat and actinic radiation, i.e., for example, metals, plastics, wood, ceramic, stone, textile, leather, glass, glass fibers, glass wool, rock wool, mineral- and resin-bound building materials, such as plasterboard and cement slabs, or roof tiles. Accordingly, the coating material of the invention is also suitable for applications outside of automotive finishing, especially for the coating of furniture and for industrial coating, including coil coating and container coating. In the context of industrial coatings, it is suitable for coating virtually all parts for private or industrial use, such as radiators, domestic appliances, small metal parts, hub caps or wheel rims. The coating material of the invention is particularly suitable as a coating for basecoats, especially aqueous basecoats, preferably in the automotive industry.

Using the coating material of the invention it is possible in particular as well to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1). The plastics to be coated may of course also be polymer bonds, modified plastics, or fiber reinforced plastics. The coating material may also be used to coat plastics which are commonly used in vehicle construction, especially motor vehicle construction. Unfunctionalized and/or nonpolar substrate surfaces may be subjected prior to coating in a known manner to pretreatment, such as with a plasma or by flaming.

The coating material of the invention comprises at least one constituent (a1) containing at least two functional groups (a11) which serve for crosslinking with actinic radiation.

Examples of suitable functional groups (a11) are epoxide groups or olefinically unsaturated double bonds, as are present in vinyl, allyl, cinnamoyl, methacryloyl or acryloyl groups, especially meth-acryloyl or acryloyl groups. As is known, the epoxide groups are used for cationic photopolymerization, whereas the olefinically unsaturated double bonds are appropriate primarily for free-radical photo-polymerization. In accordance with the invention, the constituent (a1) may comprise epoxide groups and olefinic double bonds, so that it may be subjected to crosslinking with actinic radiation by both mechanisms. However, it is of advantage to use exclusively olefinically unsaturated double bonds of the abovementioned kind as functional groups (a11).

Additionally, the constituent (a1) for use in accordance with the invention may comprise at least one, preferably at least two, functional group(s) (a12) which are able to undergo thermal crosslinking reactions with the complementary functional groups (a22) of the constituent (a2) described below.

Examples of suitable complementary functional groups (a12) and (a22) are evident from the overview below, in which R represents organic radicals.

| Overview: Examples of complementary functional groups (a12) and (a22) in the Constituent (a1) and Constituent (a2) or Constituent (a2) and Constituent (a1) | |
|---|---|
| —SH | —C(O)—OH |
| —NH$_2$ | —C(O)—O—C(O)— |
| —OH | —NCO |
| | —NH—C(O)—OR |
| | —CH$_2$—OH |
| | —CH$_2$—O—CH$_3$ |
| | —NH—C(O)—CH(—C(O)OR)$_2$ |
| | —NH—C(O)—CH(—C(O)OR)(—C(O)-R) |
| | —NH—C(O)—NR$_2$ |
| | =Si(OR)$_2$ |
| | [sic] |
| —C(O)—OH | [sic] |
| —O—C(O)—CR=CH$_2$ | —OH |
| —O—CR=CH$_2$ | —NH$_2$ |
| | —C(O)—CH$_2$—C(O)-R |
| | —CH=CH$_2$ |

The selection of the respective complementary groups (a12) and (a22) is guided on the one hand by the consideration that they should not enter into any unwanted reactions initiated by actinic radiation and should not disrupt or inhibit curing with actinic radiation, and secondly by the temperature range in which thermal curing is to take place. In this context it is of advantage according to the invention, especially with regard to heat-sensitive substrates such as plastics, to choose a temperature range which does not exceed 100° C., in particular 80° C. In the light of these boundary conditions, hydroxyl groups and isocyanate groups have proven advantageous as complementary functional groups, and so are employed with preference in accordance with the invention. Particular advantages result if the hydroxyl groups are used as functional groups (a12) and the isocyanate groups as functional groups (a22).

Where there is no functional group (a12) in the constituent (a1), the coating material I [sic] comprises at least one thermally curable constituent (a7), described in detail below. In accordance with the invention, however, it is of advantage if the constituent (a1) does comprise at least one functional group (a12).

Accordingly, the particularly advantageous constituent (a1) is an oligomeric or polymeric compound curable thermally or with actinic radiation which comprises at least one, preferably at least two and in particular at least three, hydroxyl group(s) (a12) and at least two, and in particular three, (meth)acryloyl groups (a11).

In the context of the present invention, an oligomeric compound is a compound containing in general on average from 2 to 15 repeating basic structures or monomer units. A polymeric compound, in contrast, is a compound which generally contains on average at least ten repeating basic structures or monomer units. Compounds of this kind are also referred to by those in the art as binders or resins.

In contradistinction thereto, a low molecular mass compound in the context of the present invention is a compound which derives substantially only from one basic structure or one monomer unit. Compounds of this kind are also referred to generally by those in the art as reactive diluents.

The polymers or oligomers used as binders (a1) normally have a number average molecular weight of from 500 to 50,000, preferably from 1000 to 5000. They preferably have a double bond equivalent weight of from 400 to 2000, with particular preference from 500 to 900. Furthermore, they have a viscosity at 23° C. of preferably from 250 to 11,000 mPas. They are employed preferably in an amount of from 5 to 90% by weight, with particular preference from 10 to 80% by weight, and in particular from 15 to 70% by weight, based in each case on the overall amount of the coating material.

Examples of suitable binders or resins (a1) come from the oligomer and/or polymer classes of the (meth)acryloyl-functional (meth) acrylic copolymers, polyether acrylates, polyester acrylates, polyesters, epoxy acrylates, urethane acrylates, amino acrylates, melamine acrylates, silicone acrylates and phosphazene acrylates and the corresponding methacrylates. It is preferred to use binders (a1) which are free from aromatic structural units. Preference is therefore given to using urethane (meth)acrylates, phosphazene (meth)acrylates and/or polyester (meth)acrylates, with particular preference urethane (meth)acrylates, especially aliphatic urethane (meth)acrylates.

The urethane (meth)acrylates (a1) are obtained by reacting a diisocyanate or polyisocyanate with a chain extender from the group of the diols/polyols and/or diamines/polyamines and/or dithiols/polythiols and/or alkanolamines and then reacting the remaining free isocyanate groups with at least one hydroxyalkyl (meth)acrylate or hydroxyalkyl ester of other ethylenically unsaturated carboxylic acids.

The amounts of chain extender, diisocyanate or polyisocyanate, and hydroxyalkyl ester in this case are preferably chosen so that 1.) the ratio of equivalents of the NCO groups to the reactive groups of the chain extender (hydroxyl, amino and/or mercapto groups) is between 3:1 and 1:2, preferably 2:1, and 2.) the OH groups of the hydroxyalkyl esters of the ethylenically unsaturated carboxylic acids are stoichiometric with regard to the remaining free isocyanate groups of the prepolymer formed from isocyanate and chain extender.

It is also possible to prepare the urethane (meth)acrylates by first reacting some of the isocyanate groups of a diisocyanate or polyisocyanate with at least one hydroxyalkyl ester and then reacting the remaining isocyanate groups with a chain extender. In this case too the amounts of chain extender, isocyanate and hydroxyalkyl ester are chosen such that the ratio of equivalents of the NCO groups to the reactive groups of the chain extender is between 3:1 and 1:2, preferably 2:1, and the ratio of equivalents of the remaining NCO groups to the OH groups of the hydroxyalkyl ester is 1:1. All of the forms lying between these two processes are of course also possible. For example, some of the isocyanate groups of a diisocyanate may be reacted first of all with a diol, after which a further portion of the isocyanate groups may be reacted with the hydroxyalkyl ester, and, subsequently, the remaining isocyanate groups may be reacted with a diamine.

These various preparation processes for the urethane (meth)acrylates (a1) are known, for example, from the patent EP-A-0 204 16 [sic].

The urethane (meth)acrylates (a1) may be flexibilized, for example, by reacting corresponding isocyanate-functional prepolymers or oligomers with relatively long-chain aliphatic diols and/or diamines, especially aliphatic diols and/or diamines having at least 6 carbon atoms. This flexibilization reaction may be carried out before or after the addition of acrylic and/or methacrylic acid onto the oligomers and/or prepolymers.

Further examples which may be mentioned of suitable urethane (meth)acrylates (a1) are the following, commercially available polyfunctional aliphatic urethane acrylates:

Crodamer® UVU 300 from Croda Resins Ltd., Kent, United Kingdom;

Genomer® 4302, 4235, 4297 or 4316 from Rahn Chemie, Switzerland;

Ebecryl®(284, 294, ORR351, 5129 or 1290 from UCB, Drogenbos, Belgium;

Roskydal® LS 2989 or LS 2545 or V94-504 from Bayer AG, Germany;

Viaktin® 6160 from Vianova, Austria; or

Laromer® 8861 from BASF AG, and experimental products modified from it.

Hydroxyl-containing urethane (meth)acrylates (a1) are known, for example, from the patents U.S. Pat. No. 4,634,602 or 4,424,252.

One example of a suitable polyphosphazene (meth)acrylate (a1) is the phosphazene dimethacrylate from Idemitsu, Japan.

The coating material of the invention further comprises a constituent (a2).

This constituent (a2) is also a resin within the meaning of the definition given above in the context of the description of the resins (a1). Accordingly, the resins (a2) as well come from the above-described oligomer and polymer classes. Of advantage in this case are the (meth)acryloyl-functional (meth)acrylic copolymers, which are therefore used with preference in accordance with the invention as resins (a2).

The resins (a2) are employed in an amount of preferably from 5 to 90% by weight, with particular preference from 10 to 80% by weight, and in particular from 15 to 70% by weight, based in each case on the overall amount of the coating material I [sic].

The resins (a2) comprise at least two, in particular at least three, functional groups (a21) which serve for crosslinking with actinic radiation. Examples of suitable functional groups (a21) for use in accordance with the invention are the functional groups (a11) described above.

The resins (a2) further comprise at least one, preferably at least two and, in particular, at least three functional groups (a22) which serve for thermal crosslinking. Examples of suitable such functional groups may be found in the overview given above. Isocyanate groups are particularly advantageous in this context and are therefore used with very particular preference in accordance with the invention as functional groups (a22). Particular advantages result if the resins (a2) have an isocyanate group (a22) content of from 7 to 20% by weight, with particular preference from 8 to 18% by weight, in particular from 9 to 16% by weight, based in each case on the resin (a2).

Examples of suitable resins (a2) of the type described above are described, for example, in the patents U.S. Pat. No. 5,234,970, EP-A-0 549 116 or EP-A-0 618 244.

The coating material for use in accordance with the invention may comprise at least one photoinitiator (a3). If the coating material or the primer coat is to be crosslinked using UV radiation, the use of a photoinitiator (a3) is generally necessary. Where such initiators are used, they are present in the coating material in fractions of preferably from 0.1 to 10% by weight, [lacuna] from 1 to 8% by weight, and in particular from 2 to 6% by weight, based in each case on the overall amount of the coating material.

Examples of suitable photoinitiators (a3) are those of the Norrish II type, whose mechanism of action is based on an intramolecular variant of the hydrogen abstraction reactions as occur diversely in photochemical reactions (reference may be made here, by way of example, to Römpp Chemie Lexikon, 9th, expanded and revised edition, Georg Thieme Verlag Stuttgart, Vol. 4, 1991) or cationic photoinitiators (reference may be made here, by way of example, to Römpp Lexikon Lacke und Druckfarben, Georg Thieme Verlag Stuttgart, 1998, pages 444 to 446), especially benzophenones, benzoins or benzoin ethers, or phosphine oxides. It is also possible to use, for example, the products available commercially under the names Irgacure® 184, Irgacure® 1800 and Irgacure® 500 from Ciba Geigy, Grenocure® [sic] MBF from Rahn, and Lucirin® TPO from BASF AG.

Besides the photoinitiators (a3), use may be made of customary sensitizers (a3) such as anthracene in effective amounts.

Furthermore, the coating material may comprise at least one thermal crosslinking initiator (a4). At from 80 to 120° C., these initiators form radicals which start the crosslinking reaction. Examples of thermally labile free-radical initiators are organic peroxides, organic azo compounds, or C-C-cleaving initiators, such as dialkyl peroxides, peroxocarboxylic acids, peroxo-dicarbonates, peroxide esters, hydroperoxides, ketone peroxides, azo dinitriles, or benzpinacol silyl ethers. Particular preference is given to C-C-cleaving initiators, since their thermal cleavage does not produce any gaseous decomposition products which might lead to defects in the coating film. Where used, their amounts are generally from 0.1 to 10% by weight, preferably from 0.5 to 8% by weight, and in particular from 1 to 5% by weight, based in each case on the overall amount of the coating material.

Moreover, the coating material may comprise at least one reactive diluent (a5) curable thermally and/or with actinic radiation.

Examples of suitable thermally crosslinkable reactive diluents (a5) are oligomeric polyols which are obtainable from oligomeric intermediates, themselves obtained by metathesis reactions of acyclic monoolefins and cyclic monoolefins, by hydroformylation and subsequent hydrogenation.

Examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures obtained in petroleum processing by cracking ($C_5$ cut).

Examples of suitable oligomeric polyols (a5) of this kind have a hydroxyl number (OHN) of from 200 to 450, a number average molecular weight Mn of from 400 to 1000, and a mass average molecular weight Mw of from 600 to 1100;

further examples of suitable thermally crosslinkable reactive diluents (a5) are hyperbranched compounds having a tetrafunctional central group, derived from ditrimethylolpropane, diglycerol, ditrimethylolethane, pentaerythritol, tetrakis(2-hydroxyethyl)methane, tetrakis (3-hydroxypropyl)methane or 2,2-bishydroxy-methyl-1,4-butanediol (homopentaerythritol).

These reactive diluents (a5) may be prepared in accordance with the customary and known methods of preparing hyperbranched and dendrimeric compounds. Suitable synthesis methods are described, for example, in the patents WO 93/17060 or WO 96/12754 or in the book by G. R. Newkome, C. N. Moorefield and F. Vögtle, "Dendritic Molecules, Concepts, Syntheses, Perspectives", VCH, Weinheim, N.Y., 1996.

Further examples of suitable reactive diluents (a5) are polycarbonate diols, polyester polyols, poly(meth)-acrylate diols or hydroxyl-containing polyaddition products.

Examples of suitable reactive solvents which may be used as reactive diluents (a5) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylol-propane, ethyl 2-hydroxypropionate or 3-methyl-3-methoxybutanol and also derivatives based on propylene glycol, e.g., ethoxyethyl propionate, isopropoxy-propanol or methoxypropyl acetate.

As reactive diluents (a5) which may be crosslinked with actinic radiation, use is made, for example, of (meth)acrylic acid and esters, maleic acid and its esters, including monoesters, vinyl acetate, vinyl ethers, vinylureas, and the like. Examples that may be mentioned include alkylene glycol di(meth)acrylate, polyethylene glycol di(meth) acrylate, 1,3-butanediol di(meth)acrylate, vinyl (meth) acrylate, allyl (meth)-acrylate, glycerol tri(meth)acrylate, trimethylol-propane tri(meth)acrylate, trimethylolpropane di(meth)-acrylate, styrene, vinyltoluene, divinylbenzene, pentaerythritol tri(meth)acrylate, pentaerythritol tetra(meth) acrylate, dipropylene glycol di(meth)-acrylate, hexanediol di(meth)acrylate, ethoxyethoxy-ethyl acrylate, N-vinylpyrrolidone, phenoxyethyl acrylate, dimethylamino-ethyl acrylate, hydroxyethyl (meth)acrylate, butoxyethyl acrylate, isobornyl (meth)acrylate, dimethylacrylamide and dicyclopentyl acrylate, and the long-chain linear diacrylates that are described in EP-A 0 250 631, having a molecular weight of from 400 to 4000, preferably from 600 to 2500. For example, the two acrylate groups may be separated by a polyoxybutylene structure. It is further possible to use 1,12-dodecyl diacrylate and the reaction product of 2 mols of acrylic acid with one mole of a dimeric fatty alcohol having generally 36 carbon atoms. Also suitable are mixtures of the abovementioned monomers.

Preferred reactive diluents (a5) used comprise mono-and/ or diacrylates, such as isobornyl acrylate, hexanediol diacrylate, tripropylene glycol diacrylate, Laromer® 8887 from BASF AG and Actilane® 423 from Akcros Chemicals, Ltd., UK. Particular preference is given to the use of isobornyl acrylate, hexanediol diacrylate and tripropylene glycol diacrylate.

Where used, the reactive diluents (a5) are employed in an amount of preferably from 2 to 70% by weight, with particular preference from 10 to 65% by weight, and in particular from 15 to 50% by weight, based in each case on the overall amount of the coating material.

The coating material may further comprise at least one customary and known coatings additive (a6) in effective amounts, i.e., in amounts preferably up to 40% by weight, with particular preference up to 30% by weight, and in particular up to 20% by weight, based in each case on the overall amount of coating material.

Examples of suitable coatings additives (a6) are

UV absorbers;

light stabilizers such as HALS compounds, benzotriazoles or oxalanilides;

free-radical scavengers;

crosslinking catalysts such as dibutyltin dilaurate or lithium decanoate;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts and ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and copolymers thereof, polyurethanes or acrylate copolymers, which are obtainable commercially under the trade names Modaflow® or Disperlon®;

adhesion promoters such as tricyclodecanedimethanol;

leveling agents;

film forming auxiliaries such as cellulose derivatives;

fillers such as talc, calcium carbonate and calcium sulfate, barium sulfate, titanium dioxide or zinc sulfide; for further details, reference is made to Römpp Lexikon "Lacke und Druckfarben" Georg Thieme Verlag, Stuttgart, 1998, pages 250 to 252;

electrically conductive pigments such as pretreated titanium dioxide or Minatec® 40CM from Merck, Darmstadt, Germany;

flame retardants or flatting agents.

Further examples of suitable coatings additives (a6) are described in the textbook "Lackadditive" [Additives for coatings] by Johan Bieleman, Wiley-VCH, Weinheim, N.Y., 1998.

Not least, the coating material may comprise at least one thermally curable constituent (a7) in minor amounts. In the context of the present invention, minor amounts are amounts which do not adversely affect the dual cure properties of the coating material, but instead vary them advantageously. Where used, their fraction in the coating material should generally not exceed 40% by weight, preferably 35% by weight, and in particular 30% by weight.

Examples of suitable constituents (a7) are the binders and crosslinking agents known from the thermally curable coating materials.

Examples of suitable binders (a7) are linear and/or branched and/or block, comb and/or random poly(meth)acrylates or acrylate copolymers, polyesters, alkyds, amino resins, polyurethanes, polylactones, polycarbonates, polyethers, epoxy resin-amine adducts, (meth)acrylate diols, partially saponified polyvinyl esters or polyureas, among which the acrylate copolymers, the polyesters, the polyurethanes, the polyethers and the epoxy resin-amine adducts are advantageous.

Suitable binders (a7) are sold, for example, under the trade names Desmophen® 650, 2089, 1100, 670, 1200 or 2017 by Bayer, under the trade names Priplas or Pripol® by Uniqema, under the trade names Chempol® polyester or polyacrylate-polyol by CCP, under the trade names Crodapol® 0-85 or 0-86 by Croda, or under the trade name Formrez® ER417 by Witco.

Examples of suitable crosslinking agents (a7) are blocked diisocyanates and/or polyisocyanates.

Examples of suitable diisocyanates and/or polyisocyanates for preparing the blocked derivatives (a7) are organic polyisocyanates, especially so-called paint polyisocyanates, containing free isocyanate groups attached to aliphatic, cycloaliphatic, araliphatic and/or aromatic moieties. Preference is given to polyisocyanates containing 2 to 5 isocyanate groups per molecule and having viscosities of from 100 to 10,000, preferably from 100 to 5000, and in particular from 1000 to 2000 mPas (at 23° C.). If desired, small amounts of organic solvent, preferably from 1 to 25% by weight based on straight polyisocyanate, may be added to the polyisocyanates in order thus to improve the ease of incorporation of the isocyanate and, if appropriate, to lower the viscosity of the polyisocyanate to a level within the abovementioned ranges. Examples of suitable solvent additives to polyisocyanates are ethoxyethyl propionate, amyl methyl ketone, and butyl acetate. Additionally, the polyisocyanates may have been hydrophilically or hydrophobically modified in a conventional manner.

Examples of suitable polyisocyanates are described, for example, in "Methoden der organischen Chemie", Houben-Weyl, volume 14/2, 4th Edition, Georg Thieme Verlag, Stuttgart 1963, pages 61 to 70, and by W. Siefken, Liebigs Annalen der Chemie, volume 562, pages 75 to 136. Suitable examples include the isocyanato-containing polyurethane prepolymers, which may be prepared by reacting polyols with an excess of polyisocyanates and which are preferably of low viscosity.

Further examples of suitable polyisocyanates are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane, diisocyanates derived from dimeric fatty acids as sold under the commercial designation DDI 1410 by the company Henkel, 1,8-diisocyanato-4-isocyanatomethyl octane, 1,7-diisocyanato-4-isocyanatomethyl heptane or 1-isocyanato-2-(3-isocyanatopropyl)cyclohexane, or mixtures of these polyisocyanates.

Very particular preference is given to the use of mixtures of polyisocyanates containing uretdion and/or isocyanurate groups and/or allophanate groups and based on hexamethylene diisocyanate, as are formed by catalytic oligomerization of hexamethylene diisocyanate using appropriate catalysts. The polyisocyanate constituent may otherwise consist of any desired mixtures of the free polyisocyanates exemplified above.

Examples of suitable blocking agents are the blocking agents known from the U.S. Pat. No. 4,444,954, such as i) phenols such as phenol, cresol, xylenol, nitrophenol, chlorophenol, ethylphenol, t-butyl-phenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthio-phenol or ethylthiophenol;

vi) acid amides such as acetoanilide, acetoanisidin-amide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzo-phenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also mixtures of these blocking agents, especially dimethylpyrazole and triazoles, malonic esters and acetoacetic esters or dimethylpyrazole and succinimide.

As crosslinking agents (a7) it is also possible to use tris(alkoxycarbonylamino)triazines of the general formula 5 [sic]

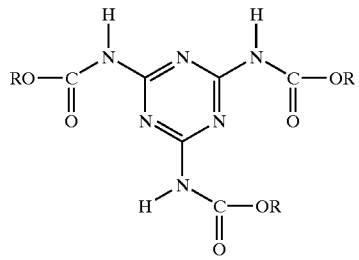

Examples of suitable tris(alkoxycarbonylamino)triazines (a7) are described in the patents U.S. Pat. No. 4,939,213, U.S. Pat. No. 5,084,541 and EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Especially suitable for use as suitable crosslinking agents (a7) are amino resins, examples being melamine resins. In this instance, use can be made of any amino resin suitable for transparent topcoats or clearcoats, or of a mixture of such amino resins. Especially suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207. The amine resins may furthermore be used also as binders (a11) in the base paint (A1).

Further examples of suitable crosslinking agents (a7) are beta-hydroxyalkylamides such as N,N,N',N'-tetrakis-(2-hydroxyethyl)adipamide or N,N,N',N'-tetrakis(2-hydroxypropyl)adipamide.

Further examples of suitable crosslinking agents (a7) are siloxanes, especially siloxanes containing at least one trialkoxy- or dialkoxysilane group.

Further examples of suitable crosslinking agents (a7) are polyanhydrides, especially polysuccinic anhydride.

If the coating material includes a resin (a1) which contains no functional groups (a12) the constituent (a7) is mandatorily in the coating material. In this case it is of advantage in accordance with the invention to use the above-described binders (a7) for this purpose.

Overall, it is of advantage for the coating material of the invention if the complementary functional groups (a12) and (a22), especially the hydroxyl groups and the isocyanate groups, are present in a molar ratio OH/NCO of from 0.5 to 2:1, with particular preference from 0.8 to 1.5:1, with very particular preference from 0.8 to 1.2:1, and in particular from 0.8 to 1.0:1.

The coating material for use in accordance with the invention may be present in different forms.

For instance, given an appropriate choice of its constituents as described above, it may be present in the form of a liquid coating material which is essentially free from organic solvents and/or water. Alternatively, the coating material may comprise a solution or dispersion of the above-described constituents in water and/or organic solvents. It is a further advantage of the coating material of the invention that solids contents of up to 80% by weight, based on the coating material, may be formulated.

Moreover, given an appropriate choice of its constituents as described above, the coating material may be a powder clearcoat material. This powder clearcoat material may if desired be dispersed in water to give a powder slurry clearcoat material.

The coating material, if permitted by the reactivity of its constituents (a1) and/or (a7) on the one hand and (a2) on the other, may be a one-component system. If, however, there is a risk of premature and thermal crosslinking of the above-mentioned constituents, it is advisable to configure the coating material as a two-component or multicomponent system, in which at least the constituent (a2) is stored separately from the other constituents and is added to them not until shortly before use.

In accordance with the sealing process of the invention, the compounds of the invention are prepared by applying the coating material of the invention to the surface of the SMCs or of the BMCs as a primer coat.

In the context of the sealing process of the invention it is possible here to apply one or more primer coats. Where two or more primer coats are applied, the coating materials of the invention that are used may differ in their material composition. In the great majority of cases, however, the desired profile of properties of the compounds of the invention is achieved with one primer coat.

The primer coat is applied in a wet film thickness such that curing in the finished compound of the invention results in a dry film thickness of the seal of from 10 to 100, preferably from 15 to 75, with particular preference from 20 to 55, and in particular from 20 to 35 µm.

The application of the coating material of the invention for the purpose of producing the primer coat may take place by any customary application method, such as spraying, knife coating, brushing, flow coating, dipping or rolling, for example. It is preferred to employ spray application methods, such as compressed air spraying, airless spraying, high-speed rotation, electrostatic spray application (ESTA), for example, alone or in conjunction with hot spray application such as hot air spraying, for example. Application may take place at temperatures of max. 70 to 80° C., so that appropriate application viscosities are attained without any change or damage to the coating material and its overspray (which may be intended for reprocessing) during the short period of thermal stress. Hot spraying, for instance, may be configured in such a way that the coating material is heated only very briefly in the spray nozzle or shortly before the spray nozzle.

The spray booth used for application may be operated, for example, with a circulation system, which may be temperature-controllable, and which is operated with an appropriate absorption medium for the overspray, an example of such a medium being the coating material of the invention itself.

Preferably, application is made under illumination with visible light with a wavelength of more than 550 µm, or in the absence of light. By this means, material alteration or damage to the coating material I [sic] and to the overspray is avoided.

The application methods described above may of course also be used to produce the clearcoat and multicoat systems of the invention in the context of the coating processes of the invention.

In accordance with the invention, following its application, the primer coat is cured thermally and with actinic radiation.

Curing may take place after a certain rest period. This period may have a duration of from 30 s to 2 h, preferably from 1 min to 1 h, and in particular from 1 min to 30 min. The rest period is used, for example, for leveling and devolatilization of the primer coat or for the evaporation of volatile constituents such as solvents, water or carbon dioxide, if the coating material was applied using supercritical carbon dioxide as solvent. The rest period may be shortened and/or assisted by the application of elevated temperatures up to 80° Celsius, provided this does not entail any damage or alteration to the primer coat, such as premature complete crosslinking, for instance.

In accordance with the invention, curing with actinic radiation takes place with UV radiation or electron beams. If desired, it may be supplemented by or conducted with actinic radiation from other radiation sources. In the case of electron beams, it is preferred to operate under an inert gas atmosphere. This may be ensured, for example, by supplying carbon dioxide and/or nitrogen directly to the surface of the primer coat.

In the case of curing with UV radiation, as well, it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. The arrangement of these sources is known in principle and may be adapted to the circumstances of the workpiece and the process parameters. In the case of workpieces of complex shape, as are envisaged for automobile bodies, the regions not accessible to direct radiation (shadow regions) such as cavities, folds and other structural undercuts may be (partially) cured using pointwise, small-area or all-round emitters, in conjunction with an automatic movement means for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

Curing may take place in stages, i.e., by multiple exposure to light or actinic radiation. This may also be done alternately, i.e., by curing in alternation with UV radiation and with electron beams.

The thermal curing as well has no special features in terms of its methodology but instead takes place in accordance with the customary and known methods such as heating in a forced air oven or irradiation with IR lamps. As with the curable actinic radiation, thermal curing may also take place in stages. Advantageously, thermal curing takes place at a temperature from 50 to 100° C., with particular preference from 80 to 100° C., and in particular from 90 to 100° C., for a period ranging from 1 minute up to 2 h, with particular preference 2 min up to 1 H, and in particular from 3 to 30 min. Where substrates are used which are able to withstand high thermal loads, thermal crosslinking may also be conducted at temperatures above 100° C. In this case it is generally advisable not to exceed temperatures of 180° C., preferably 160° C., and in particular 140° C.

Where thermal curing and curing with actinic radiation are employed together, these methods may be used simultaneously or in alternation. Where the two curing methods are used in alternation it is possible, for example, to begin with thermal curing and end with actinic radiation curing. In other cases it may prove advantageous to begin and to end with actinic radiation curing. The skilled worker is able to determine the curing method most advantageous for the case in hand, on the basis of his or her general knowledge in the art, possibly with the aid of simple preliminary tests.

Of course, the above-described curing methods may also be employed in the context of the production of the clearcoat and multicoat systems of the invention as part of the coating processes of the invention.

The compounds of the invention obtained in the manner of the invention show no signs whatsoever of microbubbles (blisters). Their surface is smooth and free from defects. Their overcoatability is outstanding, as is their thermal stability: even under thermal loads at high temperatures for several hours, the surface is not damaged. The compounds of the invention may therefore be built directly into uncoated automobile bodies and coated on the line together with them.

To produce the clearcoat of the invention, the coating material of the invention is applied by the coating process of the invention, with the aid of the application methods described above, to the primed or unprimed substrates described above, and is cured thermally and with actinic radiation.

The clearcoats of the invention may also be part of the multicoat systems of the invention.

For this purpose, the coating material of the invention is applied by the coating process of the invention not to the primed or unprimed substrates but instead to at least one color and/or effect basecoat film which is present thereon, comprising a pigmented coating material that is curable thermally and also, if appropriate, with actinic radiation.

In accordance with the invention it is of advantage to apply the coating materials of the invention by the wet-on-wet technique to the dried or flashed-off, but not fully cured, basecoat film, after which the resultant clearcoat film and the basecoat film are cured together thermally and with actinic radiation.

Suitable coating materials for producing the basecoat film are the customary and known basecoat materials, especially aqueous basecoat materials.

Examples of suitable aqueous basecoat materials are known from the patents

|  | EP-A-0 089 497, | EP-A-0 256 540, |
|---|---|---|
| EP-A-0 260 447, | EP-A-0 297 576, | WO 96/12747, |
| EP-A-0 523 610, | EP-A-0 228 003, | EP-A-0 397 806, |
| EP-A-0 574 417, | EP-A-0 531 510, | EP-A-0 581 211, |
| EP-A-0 708 788, | EP-A-0 593 454, | DE-A-43 28 092, |
| EP-A-0 299 148, | EP-A-0 394 737, | EP-A-0 590 484, |
| EP-A-0 234 362, | EP-A-0 234 361, | EP-A-0 543 817, |
| WO 95/14721, | EP-A-0 521 928, | EP-A-0 522 420, |
| EP-A-0 522 419, | EP-A-0 649 865, | EP-A-0 536 712, |
| EP-A-0 596 460, | EP-A-0 596 461, | EP-A-0 584 818, |
| EP-A-0 669 356, | EP-A-0 634 431, | EP-A-0 678 536, |
| EP-A-0 354 261, | EP-A-0 424 705, | WO 97/49745, |
| WO 97/49747, | EP-A-0 401 565, | EP-B-0 730 613 or |
| WO 95/14721. |  |  |

The clearcoats and multicoat systems of the invention exhibit good scratch resistance, intercoat adhesion, weathering stability and chemical stability and also have an outstanding profile of optical properties.

EXAMPLE 1

The Production of Compounds of the Invention

A primer coat of a coating material was in each case applied to SMCs (sheet molded compounds), as used for producing the reflectors of automobile lamps, and was predried at from 50 to 60° C. for 6 minutes and fully cured with UV radiation (from 1 to 3 joules/cm$^2$) and thermally (10 minutes at 90° C.). In all cases, the primer coat was applied in a wet film thickness such that the dry film thickness of the seal in the sealed compounds was from 25 to 27 μm.

The coating material consisted of 100 parts by weight of a urethane (meth)acrylate free from hydroxyl groups (Ebecryl® 5129 from UCB), 100 parts by weight of a polyesterpolyol (Desmophen® from Bayer AG), 2.5 parts by weight of a commercial photoinitiator (Irgacure® 819 from Ciba and Lucirin® TPO from BASF AG), 0.6 part by weight of a commercial UV absorber and light stabilizer (mixture of Tinuvin® 400 and neutral HALS from Ciba, and also a sterically hindered phenol), 50 parts by weight of a commercially oligomeric acrylate containing free isocyanate groups and acrylate groups (Roskydal® 2545 from Bayer AG) and 76 parts by weight of microtalc as filler. For application, the coating material was adjusted to spray viscosity (solids content about 30 to 40% by weight) using a suitable organic solvent (mixture of butyl acetate, n-butanol and Ektapro®).

The compounds of the invention obtained by the method of the invention showed no signs whatsoever of microbubbles (blisters). Their surface was smooth and free from defects. Their overcoatability was outstanding, as was their thermal stability: even under a thermal load of 190° C. for two hours, the surface was undamaged. The compounds of the invention gave outstanding reflectors with a long service life.

What is claimed is:

1. A coating material curable thermally and with actinic radiation, comprising
   (a1) at least one constituent containing
      (a11) at least two functional groups which serve for crosslinking with actinic radiation, and if desired
      (a12) at least one functional group which is able to undergo thermal crosslinking reactions with a complementary functional group (a22) in the constituent (a2), and
   (a2) at least one constituent containing
      (a21) at least two functional groups which serve for crosslinking with actinic radiation, and
      (a22) at least one functional group which is able to undergo thermal crosslinking reactions with a complementary functional group (a12) in the constituent (a1),
   and also optionally one or more members selected from the group consisting of (a3) at least one photoinitiator, (a4) at least one thermal crosslinking initiator, (a5) at least one reactive diluent curable thermally and/or with actinic radiation, (a6) at least one coating additive, and/or (a7) at least one thermally curable constituent, with the proviso that the coating material contains at least one thermally curable constituent (a7) if the constituent (a1) has no functional group (a12).

2. The coating material of claim 1, wherein the functional groups (a11) and (a21) comprise at least one group selected from olefinically unsaturated groups or epoxide groups.

3. The coating material of claim 1, wherein the constituent (a1) comprises a urethane (meth)acrylate and the constituent (a2) comrpises at least one member selected from a (meth)acrylate-functional (meth)acrylate copolymer containing free isocyanate groups, a (meth)acrylate-functional polysacyanate, and mixtures thereof.

4. A process of sealing a substrate selected from the group consisting of SMCs (sheet molded compounds) and BMCs (bulk molded compounds), comprising
   applying the coating material of claim 1 to a substrate selected from the group consisting of SMC substrates and BMC substrates to provide a coated substrate, and
   curing the coated substrate with actinic and thermal energy to provide a sealed substrate.

5. A process for eliminating microbubbles from topcoated microporous substrates, comprising
   applying a coating composition to a microporous substrate to provide a coated microporous substrate, said coating composition curable both actinically and,
   curing the coated microporous substrate both actinically and thermally to provide a sealed microporous substrate,
   applying one or more topcoat coating materials to the sealed microporous substrate to provide a topcoated sealed substrate, and
   thermally curing the topcoated sealed substrate to provide a topcoated microporous article having no microbubbles.

6. An SMC (sheet molded compound) or BMC (bulk molded compound) sealed with the coating material of claim 1.

7. An automobile comprising sealed SMC (sheet molded compound) and/or BMCs (bulk molded compounds) as claimed in claim 6.

8. The process of claim 5 wherein the thermal cure of the coated microporous article and the topcoated sealed substrate occur simultaneously.

9. The process of claim 5 wherein the one or more topcoating materials are selected from the group consisting of charcoals, colored topcoats effect coating materials, and mixtures thereof.

10. An article selected from the group consisting of motor vehicle parts, plastics parts, furniture, coils, containers, and industrial parts which is made by the process of claim 5.

11. The coating material of claim 1, wherein the functional groups (a12) comprise hydroxyl groups.

12. The coating material of claim 1, wherein the functional groups (a22) comprise isocyanate groups.

13. The coating material of claim 2, wherein the functional groups (a11) and (a21) are olenifically unsaturated groups.

14. The process of claim 5 wherein said coating composition comprises
at least one constituent (a1) having at least two functional groups (a11) and no functional groups (a12).

* * * * *